235-379 SR

2/21/84 XR 4,433,436

United States Patent [19]

Carnes

[11] 4,433,436

[45] Feb. 21, 1984

[54] SIGNATURE VERIFICATION SYSTEM

[76] Inventor: W. Robert Carnes, 32 Phillips La., Darien, Conn. 06820

[21] Appl. No.: 264,344

[22] Filed: May 18, 1981

[51] Int. Cl.³ .................................... G06K 9/00

[52] U.S. Cl. .................................... 382/3; 235/379; 235/487; 283/58

[58] Field of Search ............ 340/146.3 SY, 146.3 SG, 340/146.3 R, 825.3, 825.31, 825.32, 825.33, 340/825.34; 283/57-59, 60 R, 60 A; 235/379-382, 235/379-487; 178/18-20; 382/3, 30

[56] References Cited

U.S. PATENT DOCUMENTS

| | | | |
|---|---|---|---|
| 3,282,720 | 11/1966 | Oleksiw | 283/58 |
| 3,806,704 | 4/1974 | Shinal | 340/146.3 SY |
| 3,950,013 | 4/1976 | Tagliaferri | 283/58 |
| 3,955,178 | 5/1976 | Warfel | 340/146.3 SY |
| 4,008,457 | 2/1977 | Radcliffe | 340/146.3 SY |
| 4,009,892 | 3/1977 | Nickerson | 283/58 |
| 4,035,769 | 7/1977 | Sternberg et al. | 340/146.3 SY |
| 4,231,593 | 11/1980 | Bell, Jr. et al. | 283/58 |
| 4,234,868 | 11/1980 | Radice | 340/146.3 SY |

*Primary Examiner*—Leo H. Boudreau

*Attorney, Agent, or Firm*—John K. Conant

[57] ABSTRACT

In a system for verifying a person's handwritten signature on a travelers check or the like by comparing the signature with a signature previously written by the person whose name is signed, both signatures are written on signature fields on the face of the check. Each field incorporates a similar arrangement of lines of pressure sensitive material that produces visible marks on the back of the check at points at which the lines of the signatures cross lines of the pressure sensitive material. When the patterns of marks thus produced are compared, dissimilarities between the patterns indicates that the two signatures were not made by the same person.

9 Claims, 2 Drawing Figures

SIGNATURE VERIFICATION SYSTEM

BRIEF SUMMARY OF THE INVENTION

The present invention is a system for verifying a person's handwritten signature, as on a travelers check or the like, on which the person signs his or her name when the check is purchased and then countersigns it when he or she wishes to negotiate the check, to purchase goods or services or to cash it in. The signatures are written in two signature fields on the face of the check so that the signature in one field can be readily compared with the countersignature in the other field. Heretofore the two signatures on the face of the check have merely been compared, as they appear on the face, as means for determining if they were both made by the same person.

In the first instance it is the responsibility of the person or company accepting the check for value to determine if the person countersigning the check is the person who originally purchased and signed it. This is the purpose of the countersignature. If the two signatures are the same name and are closely similar in appearance, the second signature, the countersignature, and hence the negotiation of the check, is presumed to be valid. Of course, if the person accepting the check for value has some reason to suspect that the countersignature is forged, for example, by reason of suspicious appearance or behavior of the person countersigning, the person to whom the check is tendered for acceptance has an obligation to request further indentification. But, if the two signatures appear to have been made by the same person and there is no reason to suspect forgery, the person accepting the check for value will normally be protected if in fact the countersignature turns out to have been a forgery. That is, unless the person accepting the check with a forged countersignature obviously should have seen that the signature was forged, companies and banks in the business of issuing travelers checks will, in order to maintain the ready acceptability of their checks in commerce, redeem them without further question.

Merely by comparing the appearance of two signatures ostensibly made by the same person it is substantially impossible for anyone, except for one specially trained in the detection of forgery, to detect a forged signature that has been forged by a skilled forger. Consequently the loss to banks and companies that issue travelers checks, due to forgery runs into the millions of dollars every year.

A principal object of the present invention is to provide a simple and effective system with which the forgery of a countersignature is made more readily apparent and thus more easily and more often detected.

A further object is to provide such a system which does not necessarily require any supplemental apparatus, but with which electronic scanning equipment may be used, without alteration of the structure, to obtain even greater sensitivity to forged countersignatures.

In accordance with the invention the two signature fields on the face of a travelers check and the like instrument, on which the person purchasing the check and subsequently negotiating it signs and countersigns it, respectively, are provided with fine lines of pressure sensitive material which produces visible dots or marks on the back of the check at the points at which the lines of the signatures cross the lines of pressure sensitive material.

A signature in connection with which this invention is used is a person's handwritten signature written with a tipped instrument, such as a pen—nib type, ballpoint or felt or composition tipped—or pencil, which produces a visible line on paper or the like when the instrument is moved over the paper under pressure.

The material for the lines of pressure sensitive material is suitably a material which is on the market for use in copy paper in place of carbon black on carbon paper. The material in one form consists of minute globules of ink each encapsulated in a synthetic resin plastic, in another form it consists of minute droplets of ink dispersed in a synthetic resin plastic carrier. In both the globules or droplets of ink are so small that they are not visible to the naked eye when a thin layer of the material is coated on or embedded in paper or the like. Pressure applied to a point on the material squeezes ink out of the globules or carrier at that point and the ink from a number of the tiny globules or droplets at that point coalesce to form a visible dot or mark. The density of the dot or mark is a function of the pressure applied at that point.

For the purpose of this invention the pressure sensitive material, including an adhesive or binder, is painted or printed in fine lines on the back of the check, at the backs of the signature fields, so that dots or marks will be produced on the back of the check at the points at which the lines of the signatures written in the signature fields on the front cross the lines of the pressure sensitive material. A multiplicity of lines, at least four or five, of pressure sensitive material are provided in back of each signature field. Each signature field is preferably provided with a visible base line to indicate where the signature should be made and the lines of pressure sensitive material, which are suitably parallel, are in the same relative positions to each other and to the base line in each signature field.

It has been determined that the elapsed time a person takes in signing his or her name, regardless of the particular type of writing instrument used (ballpoint pen or felt tipped pen, for example), remains substantially constant for that person. Also each person will vary the writing pressure applied at successive portions of the lines of his or her signature in a pattern of pressure gradations that is substantially constant for that person each time he or she signs his or her name. These time and pressure constants are thus identifiable personal characteristics, like fingerprints.

It has also been determined by various studies by government agencies that forged signatures are invariably written slowly, deliberately and with a substantially constant pressure over all parts of the signature. The pressure applied is also most usually heavier than in the authentic signature.

Studies and experience thus establish as fact that a clever forger can duplicate the appearance of someone elses signature but can not duplicate the characteristic pressure variations of the authentic signature.

In accordance with the system of the present invention the signature and countersignature written respectively on the two signature fields on the front of a travelers check each produce a dot or mark at points where the signature lines cross the lines of pressure sensitive material. These dots or marks are visible on the back of the check and form a characteristic pattern for each signature. If at a particular point of crossing the pressure of the signature line is less than the pressure at which a mark is produced, of course no mark appears;

at points at which the pressure is sufficient to produce a mark the density of the mark is indicative of the pressure applied to produce it.

Thus if the patterns of marks, and the patterns of density variation of the marks, that are produced respectively by the signature and countersignature do not substantially correspond, it is an indication that the two signatures were not made by the same person. While lack of correspondence is not conclusive of forgery of the countersignature, it indicates the clear possibility of forgery and alerts the person being asked to accept the countersignature as genuine that he or she should ask the person signing for additional identification.

The dot or mark pattern production and comparison in accordance with this invention is far more effective in revealing the possibility of a forged countersignature than mere comparison of the signatures themselves.

Moreover, not only are the dot or mark patterns produced in accordance with the invention adapted to be compared visually, they are also adapted without any change of form for comparison by electronic means such as by the use of well known electronic scanning and signal comparison techniques. The use of electronic scanning increases accuracy by providing definitive results in cases in which the naked eye might not pick up slight variations is the densities of the dots or marks.

It will be appreciated that the system structure of this invention could be used in various forms other than for travelers checks and the like with which a signature and countersignature are on the same instrument. For example a person's specimen signature and dot pattern could be provided on an identity card to be compared with any number of subsequent signatures at other locations; the only requisite would be that the arrangements of pressure sensitive lines be the same for the identity card and at other locations.

BRIEF DESCRIPTION OF THE DRAWINGS

Further objects and advantages of the signature verification system of this invention will be apparent from the following description of the illustrative embodiment shown in the accompanying drawings in which.

DETAILED DESCRIPTION

Figure 1:
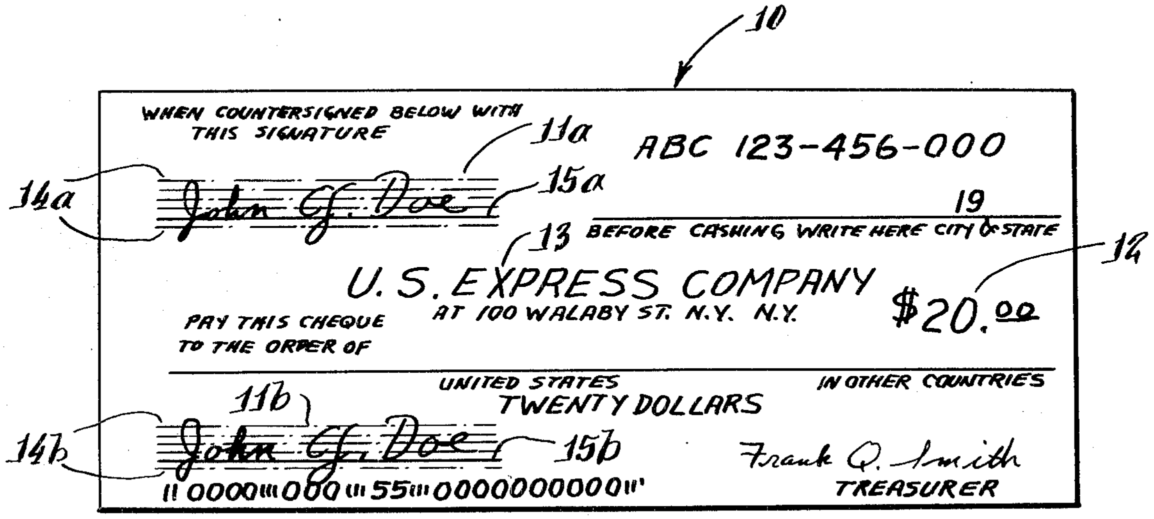
FIG. 1 is a plan view of the face of a travelers check incorporating the system of this invention.

Referring to FIG. 1*a* conventional travelers check 10 has on its face a first signature field 11*a* and a second signature field 11*b*. The face value of the check is indicated at 12. At the time a person purchases the check from the issuing company, indicated at 13, he or she signs the check on signature field 11*a*, as a specimen signature. When that person wishes to negotiate the check, to pay for goods or services or to cash it in, he or she countersigns it on signature field 11*b*. Heretofore visual comparison of the countersignature in field 11*b* with the specimen signature in field 11*a* has been the method for the person accepting the check for value to determine if the one countersigning is the person who signed originally.

In accordance with the invention each of the signature fields, 11*a* and 11*b*, has incorporated therein lines, indicated by dash lines at 14*a*, 14*b*, of pressure sensitive material which produces visible dots or marks (16 in FIG. 2) at points thereon to which more than a predetermined minimum pressure is applied. As previously described a suitable material consists of tiny discrete globules of ink encapsulated in a matrix. The globules of ink are not visible to the naked eye in the matrix, but when pressure is applied at any point ink from a number of globules at that point are squeezed out and coalesce to form a visible dot or mark whose density is proportional to the pressure which caused it to appear. Thin lines 14 of the material are painted or printed on the back of the check, or incorporated in some other suitable way, so that the dots or marks from application of pressure on the front of the check appear on the back.

The signature fields 11*a*, 11*b* each preferably have a visible base line printed thereon, as indicated at 15*a*, 15b, to indicated where the signatures should be written.

The lines 14*a*, 14*b* of pressure sensitive material in the respective signature fields are located in the same relation to each other and to the base line 15 in both fields 11*a*, 11*b*. As shown the lines 14 of pressure sensitive material are suitably parallel straight lines but they could be other forms and in other directions, curved or oblique, for example, the critical factor being that they be so placed as to be crossed by lines of signatures written on the signature fields.

The number of such lines 14 is not critical, but at least four or five lines 14, with at least one being below the base line, 15*a* or 15*b*, and two above should be provided for minimum effective practice of the invention. In the preferred form a multiplicity of closely spaced lines, for example, twenty lines spaced a millimeter apart, are provided so that the patterns of dots 16 will be comparable for similar signatures even though the two signatures may not both be written exactly on the base line, 15*a* or 15*b*.

Figure 2:
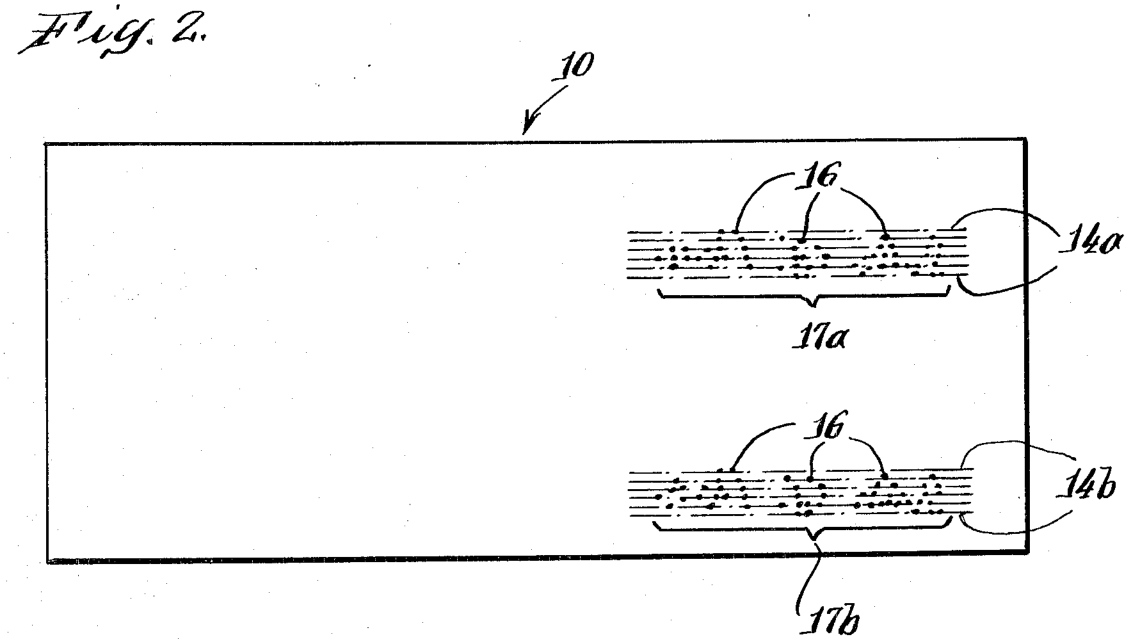
FIG. 2 is a view of the back side of the check of FIG. 1 showing the dot patterns produced in accordance with the invention.

When a name is signed in a signature field 11*a* or 11*b* the pressure of the writing produces a pattern of dots or marks 16 on the back of the check. FIG. 2 shows the patterns 17*a*, 17*b* of dots or marks 16 produced on the back of check 10 by signatures written in the fields 11*a* and 11*b*, respectively, on the face of the check.

As explained above, the particular pattern of dots 16, and the pattern of densities of the respective dots forming the pattern, are formed in correspondence with the varying pressure along the lines of the signature where the signature lines cross the lines 14 of pressure sensitive material.

If the pattern 17*b* of dots, and the pattern of densities of the dots, produced by a countersignature written in field 11*b* differ from the the dot, and dot density, pattern 17*a* produced by the original, specimen signature previously written in field 11*a*, this indicates that the countersignature was not made by the person who signed the original, specimen, signature. This would thus suggest to the person to whom the check was being tendered for value that he or she should request further identification from the person who signed the countersignature in order to determine for sure whether or not the person countersigning is in fact the same person whose name was originally signed in field 11*a* when the check was purchased.

What is claimed is:

1. A signature verification system comprising in combination:

two signature fields on sheet material adapted for a person to handwrite his or her signature within each of said fields on said sheet material with a (tipped) writing instrument, each of said fields having incorporated therein a similar pattern of lines of a pressure sensitive material of a type that will produce a visible mark at each point at which more than a predetermined minimum of pressure is applied thereto and with which the density of the mark thus produced is proportional to the amount of said pressure greater than said minimum, whereby when one signature is handwritten in one of said fields and another signature is subsequently handwritten in the other of said fields each of said signatures produces a distinctive pattern of visible marks, and a distinctive pattern of densities of said marks, in the respective fields by lines of said signatures crossing lines of said pressure sensitive material, whereby the first written signature provides a specimen pattern of said marks with which the pattern of said marks produced by said subsequently written signature can be compared for providing an indication whether or not the two signatures were written by the same person.

2. The system of claim 1 in which said pressure sensitive material is incorporated in said fields on said sheet material such that said visible marks are produced on the side of said sheet material opposite the side to which the pressure which produces the mark is applied.

3. The system of claim 1 in which both of said fields are on the same side of a single sheet of said sheet material and in which said pressure sensitive material is incorporated such that said marks produced by pressure applied thereto by a signature written as aforesaid on either of said fields are visible on the other side of said sheet.

4. The system of claim 1 in which said lines of pressure sensitive material are parallel to the direction in which signatures are to be written on said signature fields.

5. The system of claim 1 in which each of said fields includes a visible line on which a person's signature is to be written, the visible line in each field being in the same position relative to said lines of pressure sensitive material as in the other field.

6. The system of claim 5 in which in each field said lines of pressure sensitive material are parallel to said visible line in that field.

7. The system of claim 6 in which each field incorporates at least four of said lines of pressure sensitive material.

8. The system of claim 7 in which in each field at least one of said lines of pressure sensitive material is at one side of said visible line and at least two are at the other side thereof.

9. The system of claim 8 in which both of said fields are on a single sheet and are both on the same side thereof.

* * * * *